No. 755,197. PATENTED MAR. 22, 1904.
F. L. O. WADSWORTH.
ILLUMINATING STRUCTURE.
APPLICATION FILED APR. 30, 1902.
NO MODEL. 2 SHEETS—SHEET 1.
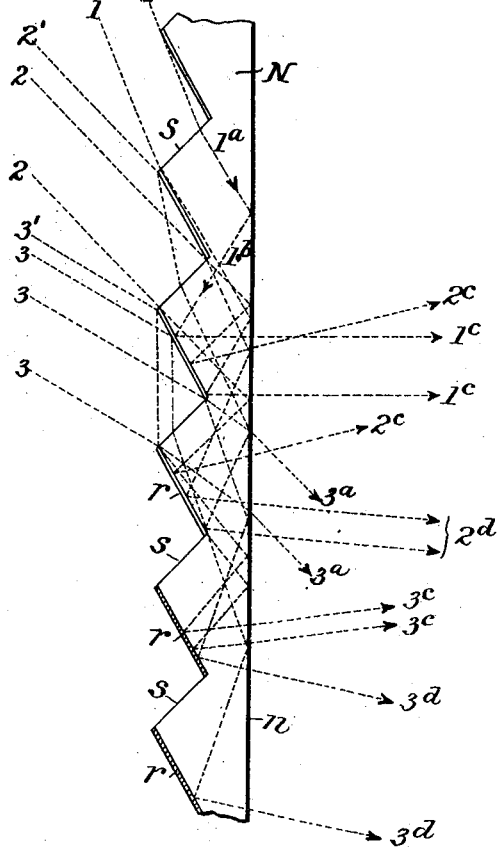
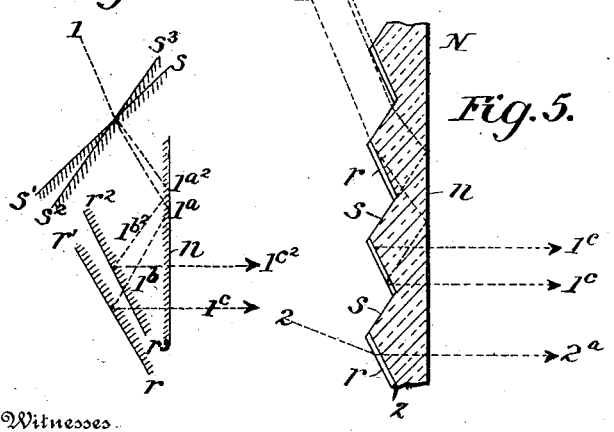
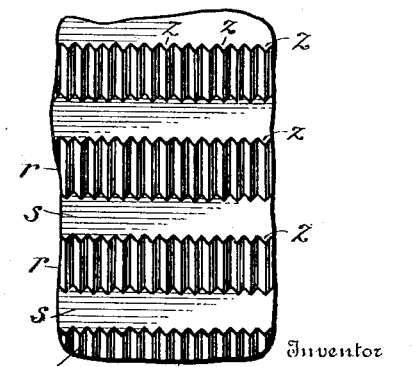
Inventor
Frank L. O. Wadsworth
By Foster Freeman
Attorneys
Witnesses
J. E. Hinkel
Wm. Gillman Jr.

No. 755,197. PATENTED MAR. 22, 1904.
F. L. O. WADSWORTH.
ILLUMINATING STRUCTURE.
APPLICATION FILED APR. 30, 1902.
NO MODEL. 2 SHEETS—SHEET 2.
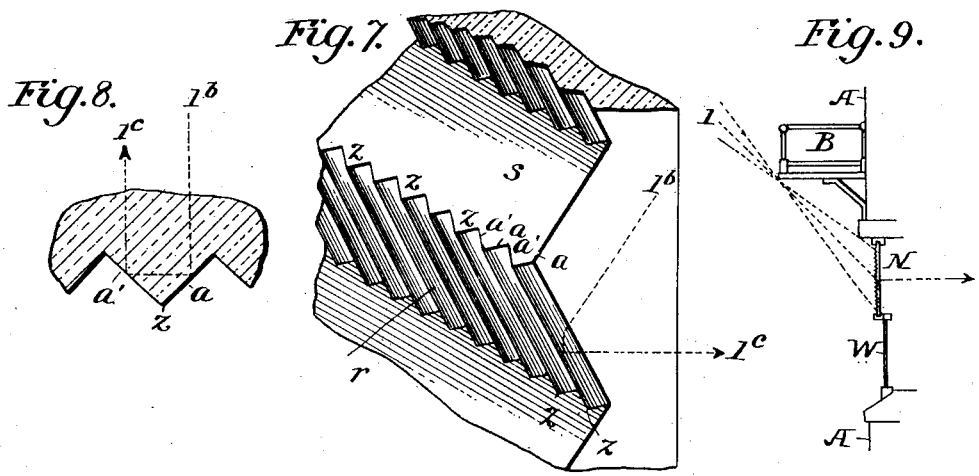
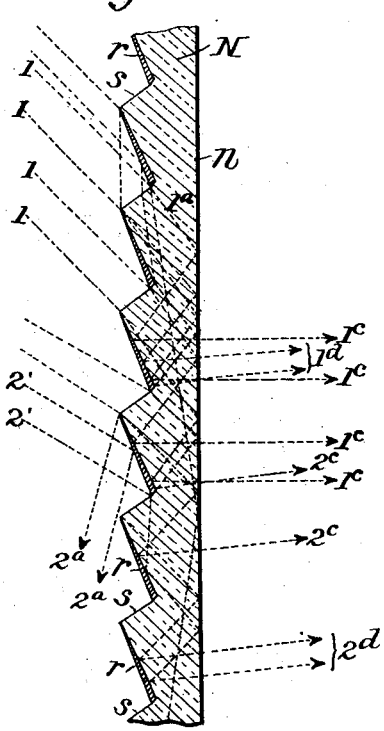
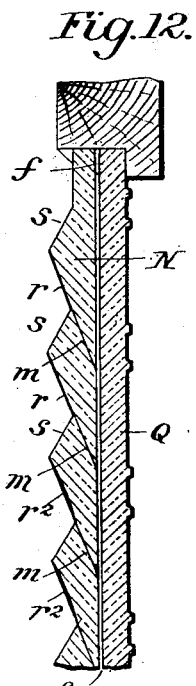
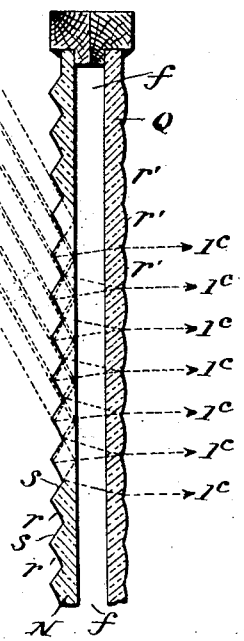
Witnesses
Inventor
Frank L. O. Wadsworth,
By
Attorneys No. 755,197.

Patented March 22, 1904.

UNITED STATES PATENT OFFICE.

FRANK L. O. WADSWORTH, OF ALLEGHENY, PENNSYLVANIA, ASSIGNOR TO PRESSED PRISM PLATE GLASS COMPANY, A CORPORATION OF WEST VIRGINIA.

ILLUMINATING STRUCTURE.

SPECIFICATION forming part of Letters Patent No. 755,197, dated March 22, 1904.

Application filed April 30, 1902. Serial No. 105,372. (No model.)

*To all whom it may concern:*

Be it known that I, FRANK L. O. WADSWORTH, a citizen of the United States, residing at Allegheny, in the county of Allegheny and State of Pennsylvania, have invented certain new and useful Improvements in Illuminating Structures, of which the following is a specification.

My invention is an illuminating structure constructed, as fully set forth hereinafter, so as to be more easily manufactured, more efficient in performance, and when in position less liable to damage and more easily cleaned than many of the older forms of such structures.

In the accompanying drawings, Figure 1 illustrates in part section a part of one form of my improved structure. Fig. 2 is a diagram illustrating the method of laying off prism-angles in the new form of structure. Figs. 3 and 4 illustrate modifications. Figs. 5 and 6 illustrate another form of construction. Figs. 7 and 8 illustrate method of operation of form shown in Figs. 5 and 6. Fig. 9 illustrates conditions under which structures similar to those shown in Fig. 10 would be employed. Figs. 10 and 11 illustrate other structural modifications. Figs. 12 and 13 illustrate other structural and optical modifications in which an auxiliary plate is employed.

In the ordinary form of prismatic illuminating structures acting either by refraction alone or by reflection alone the angles of the prisms must be very acute to produce the required deflection of the light-rays which are most efficient for producing an increased illuminating effect in the apartment. On account of these sharp projecting prisms the plates are difficult and expensive to make, liable to damage from the chipping off of the points of the prisms, and difficult to clean when in position. In previous structures in which the prisms have been formed on the receiving side the angles of the prisms and the inclination of the receiving-faces to the principal incident rays of light have been such that these rays are directed, first, against the reflecting sides of the prism elements and thence against the emergent side at such an angle (usually perpendicularly) that they emerge therefrom without substantial change of direction.

I have discovered that by utilizing an entirely new principle of operation it is practicable to secure the desired deflection of the illuminating-rays with very obtuse-angled prisms, thereby avoiding all the difficulties above mentioned, as well as securing in many cases other advantages, such as increased optical efficiency of performance, better protection against fire or storms, &c. This new principle of operation consists in forming the prismatic illuminator with a substantially plane and continuous transparent surface on one side and on the other a series of obtuse-angled prisms, one side of each so formed as to totally reflect rays falling upon it from the interior of the sheet. The upper or receiving sides of the prism elements are transparent and are inclined to the plane of the structure at an obtuse angle such that the rays of light falling upon them from the principal source of illumination are directed against the inner plane emergent side of the sheet at an angle less than the critical angle or angle of total internal reflection, which for most kinds of glass is not far from forty-seven degrees to the plane of the structure. None of these rays therefore at first incidence emerge from the interior side of the structure, but are reflected therefrom by total internal reflection and are directed again toward the front of the structure in such a direction as to fall upon the lower sides of the prism elements. These sides are so formed and so inclined that the above rays incident thereon are totally reflected therefrom for the second time toward the back of the structure, this time at such an angle as to emerge in the required direction in which an increasd illuminating effect is desired. To obtain total internal reflection at this last set of surfaces, the latter are silvered, enameled, or coated with other opaque reflecting material or formed into a set of auxiliary prisms which present surfaces of total internal reflection to the rays incident upon them at an angle in the plane of reflection. Thus in the construction of Figs.

1, 3, 4, 9, 10, and 11 the plate N has a plane flat face $n$ and at the receiving or incident face a series of prism elements with entrance-faces $s$ and reflecting-faces $r$, these faces being at a greater angle to each other than a right angle. In such structures the rays 1 1 falling on the receiving-surfaces $s$ $s$ $s$ of the prism elements are thereby deflected in the directions $1^a$ against the inner plane surface $n$ of the plate N, reflected therefrom (by total internal reflection) in the directions $1^b$ against the reflecting sides $r$ $r$ $r$ of the prism elements, and from them reflected a second time through the body of the structure in the required direction $1^c$ $1^c$. Inasmuch as the rays this time meet the inner plane emergent surface at very nearly a right angle, they of course pass through the same practically unchanged in direction. It is readily seen that by making use of this new principle of operation I am enabled to use in the first place very obtuse-angled prisms, and thus avoid all the structural disadvantages above enumerated incident to the use of the ordinary forms. In the new form the angles indeed become more obtuse as the required angle of deviation increases, as shown by comparing the form in Fig. 1, which is designed to receive light from a principal source of illumination about eighty degrees above the horizontal and direct it horizontally into the space to be illuminated, and the form shown in Fig. 10, in which the highest rays incident upon the structure come from about forty-five degrees above the horizontal. These last structures are to be used under such conditions as are illustrated in Fig. 9, where a balcony B or other obstruction above the window W of the wall A A cuts off the more nearly vertical rays incident on the illuminating structure N. Usually, however, it is light from more nearly vertical directions, as 1 1, Figs. 1, 2, 3, and 4, which it is desired to most fully utilize, and in the utilization of which the structural advantage of the new form over the old is most evident.

Within certain limits the angles of the two faces $s$ and $r$ of the prism elements in the new structure may be considerably varied and can be laid out as shown in the diagram Fig. 2. Given the direction 1 of the principal incident rays and the position of the surface $n$, I first lay off a surface $s$ $s'$ and trace out by any suitable method the direction $1^a$ of the rays 1 as refracted at this surface and the direction $1^b$, which this refracted ray takes after the internal reflection at the surface $n$, then lay off the surface $r$ $r'$ at such an angle that the ray $1^b$ is reflected in the reqired direction $1^c$. If I lay off an initial surface $s^2 s^3$, making a larger angle with the incident rays 1, (or a less angle with the general plane of the plate,) the direction of refraction $1^{a2}$ and of first reflection $1^{b2}$ will make larger angles with the plane of the rear surface $n$ and the required surface $r^2$ $r^3$ will be inclined at a smaller angle to the plane of the plate. To obtain the most obtuse-angled prisms, I therefore make the inclination of the front surface $s$ as large as possible to the incident rays and as small as possible to the general plane of the plate. I must, however, not go so far in this that the direction $1^a$ or $1^{a2}$ of reflection at the surface $s$ makes less than the angle of total internal reflection with the face N of the plate, and in general it is desirable that the direction of reflection $1^b$ from this surface shall not make a substantially larger angle with said surface than does the initial surface $s$, for if it did some of the rays after the first reflection at N might again strike the surface $s$, and although if they did they would be reflected therefrom toward the interior of the plate in such a direction as to be ultimately utilized such a series of multiple reflections would be in general undesirable, because unnecessary for the accomplishment of the object desired.

The improved structure also utilizes rays from other than the principal direction 1 1 1 very efficiently. Thus the rays 2 2, Fig. 1, falling on the structure are in part received on the faces $s$ and after being treated in the same manner as the rays 1 1 emerge from the inner side in the directions $2^c$ $2^c$, slightly inclined upward toward the ceiling of the room, and in part $2'$ $2'$, received on the faces $r$, whence they are first externally reflected downward from the outer side of the coated surfaces $r$ to the faces $s$ below and there refracted and treated as before, so as to emerge at $2^d$ $2^d$ in a direction nearly parallel to $1^c$ $1^c$. Even when the rays falling on the structure come from nearly horizontal directions, as at 3 3, a large part $3'$ $3'$ are received by the faces $r$, reflected, as before, to $s$, and then so treated as to emerge from the inner side in directions $3^c$ and $3^d$ nearly parallel to $1^c$. Those parts of the bundles of incident rays 3 3 which fall on the surfaces $s$ $s$ are not lost, but enter the room, although in a downward direction, as at $3^a$ $3^a$, after a simple refraction at the rear surface N. In Fig. 10, in which, as already pointed out, the structure is designed for principal rays from a much lower inclination than in Fig. 4, the principal rays are in part received directly on the surfaces $s$ $s$ and treated like the rays 1 1 of Fig. 4, emerging at $1^c$ $1^c$, and in part on the surfaces $r$ $r$ and treated like the rays $2'$ $2'$ of Fig. 1, emerging at $1^d$ nearly parallel to $1^c$. The rays 2 2 from lower down are also in this case in large part efficiently directed into the room, as at $2^c$ $2^c$ $2^d$ $2^d$, and only in small part reflected from the faces $r$, as at $2^a$ $2^a$, in such direction as to be unutilized.

Instead of making the faces $r$ $r$ of the prisms reflecting by coating them with silver, enamel, &c., we can also secure the result desired by providing the faces $r$ $r$ of each of the main prisms with a series of minor prisms $z$ $z$ $z$, which run across the face of the larger prisms at nearly a right angle thereto. I am enabled thus to secure a series of surfaces which are always at less than the critical angle of internal reflection to the principal rays $1^b$ incident thereon and from which in consequence the whole body of such rays is totally internally reflected at the auxiliary faces $a\ a'$, Fig. 8, even more effectually than from a plain coated surface. In the case of this construction rays incident on such surfaces from outside, as at 2, Fig. 5, are freely refracted and transmitted directly into the space behind such plates, as at $2^a$, instead of being first reflected downward against the surfaces $s\ s$, as in Figs. 1 and 10.

In order to most fully realize the advantages of this new form of structure, it will be evident from what has preceded that the rear emergent surfaces of the plate N should be substantially flat. When it is for any reason desirable to have for illuminating or ornamental purposes or otherwise a figured emergent surface, I secure this by means of a longitudinal air-film $f\ f$, having substantially parallel sides. This air-film in contact with the rear surface of the plate N then acts as a total reflecting-surface as before for those rays incident upon it at less than the critical angle of total internal reflection, while permitting (by virtue of the substantially uniform thickness) the rays of light falling upon it at nearly normal incidence to pass through it unchanged in direction. The longitudinal air-film may be obtained in different ways—as, for instance, by use of a second plate Q, as in Fig. 12, placed back of the first and separated from it the required distance. Then any desired ornamental figure may be placed on the rear emergent face of the structure without interfering in any way with the optical performance of the deflecting elements of the structure.

Ordinary prismatic illuminating structures consisting of a single plate discharge the light falling on their receiving-surfaces in a series of separated bundles, as at $1^c\ 1^c\ 1^c$, Figs. 3 and 4. In the improved form or structure I can by properly proportioning the thickness of the structure, as in Fig. 4, break up the issuing streams $1^c\ 1^c$ each into two streams $1^{cc}$ and $1^{ccc}$, so that the illumination back of the plate is still more nearly continuous. I may by a modification of the form of the reflecting-surfaces $r\ r$ and the addition of a second plate render the illumination absolutely continuous, as shown in Fig. 13. In this case the reflecting-faces $r$ are slightly curved in transverse cross-section, so as to cause the streams of light reflected therefrom to diverge, so as to completely fill the space behind the plate N. By placing a second plate Q, having convexly-curved ribs $R'\ r'\ r'$, behind the plate N the divergence of the rays produced by the curvature of the reflecting-faces $r\ r\ r$ may, if desired, be corrected, so as to make the issuing rays of light $1^c\ 1^c$ not only continuous, but parallel, as in Fig. 13.

In building up certain of the improved forms of prismatic structures herein described I may use either integral plates, as in Figs. 1, 3, 4, or 10, or bars of transparent material, with their meeting faces $m\ m$ fused or cemented together with transparent cement or flux, as in Fig. 12, or two plates $N'\ N^2$, with the intermediate space filled with transparent material of substantially the same refractive index as the material of the plates, Fig. 11.

The reflecting-surfaces $r\ r$ may be films of metal deposited on the surface of the glass or bars of metal, enamel, or other material with reflective-faces fused or otherwise connected thereto or a series of auxiliary prisms, as already described. In the case metal or opaque reflective material is used the two outer and inner reflecting-surfaces may be parallel, as in Figs. 1, 3, and 4, or inclined to each other, as in Figs. 10 and 12, both curved convexly, as in Fig. 11, or concavely, as in Fig. 13, or one side curved and the other flat, as illustrated at $r^2\ r^2$, Fig. 12. In general this reflecting-coating is placed directly on the external surfaces of the prism elements; but it may be on the inside of an outer sheet of glass, as at $t\ t$, Fig. 11.

In case the total internal reflection of the rays is secured by the use of the auxiliary small prisms $z\ z\ z$, as in Figs. 5, 6, and 7, these prisms may be formed integral on the sheet or may be formed separately and cemented to the faces $r\ r$ with transparent cement.

Without limiting myself to any of the precise forms of plates or details of construction shown, what I claim is—

1. An illuminating structure having a plane transparent face upon one side and obtuse-angled prism elements on the other, one face of each prism arranged to deflect the principal light-rays upon the said plane face at less than the critical angle, and the other prism face arranged to act as a totally reflecting-face for the said deflected rays, substantially as set forth.

2. An illuminating structure having a plane emergence face and a series of prism elements at the opposite side each with a transparent incidence face and a total internal reflecting-face at an obtuse angle to the incident face, substantially as set forth.

3. An illuminating structure having a plane emergence face and a series of prism elements at the opposite side, one face transparent and the other face totally reflecting for rays falling upon it in the plane of incidence, the two faces making an obtuse angle with each other, substantially as set forth.

4. An illuminating structure having a series of prism elements on its receiving side, each with a transparent incident face and a face, the surface of which is formed to receive the principal rays of light incident thereon at less than the critical angle and reflect them through the emergence face, substantially as set forth.

5. An illuminating structure having prism elements on the receiving side and a plane emergence face on the other, one face of each prism element provided with a series of smaller auxiliary prisms at right angles to the line of the prisms adapted to totally reflect the principal light-rays incident thereon, substantially as set forth.

6. An illuminating structure having on one side a series of obtuse-angled prisms, each with a plane transparent face and a second face formed of a series of auxiliary prisms running across the face of the main prisms, at right angles to the line of the prisms, substantially as described.

7. An illuminating structure having a series of obtuse-angled prisms each of which is provided with a face consisting of a series of parallel auxiliary prisms at an angle to the line of the main prisms and adapted to totally reflect all light falling upon them from the interior of the plate in a plane at right angles to the said main prisms, substantially as described.

In testimony whereof I have signed my name to this specification in the presence of two subscribing witnesses.

FRANK L. O. WADSWORTH.

Witnesses:
H. M. CORWIN,
L. M. REDMAN.